J. BIRKENHEAD.

Bolster and Supporting Rail of Spinning Machine Spindles.

No. 9,699. Reissued May 10, 1881.

*Witnesses*
S. N. Piper
W. H. Preston

*Inventor.*
John Birkenhead
*by attorney.*
R. H. Eddy

N. PETERS, Photo-Lithographer, Washington, D.C.

UNITED STATES PATENT OFFICE.

JOHN BIRKENHEAD, OF MANSFIELD, ASSIGNOR TO THE SAWYER SPINDLE COMPANY, OF BOSTON, MASSACHUSETTS.

BOLSTER AND SUPPORTING-RAIL OF SPINNING-MACHINE SPINDLES.

SPECIFICATION forming part of Reissued Letters Patent No. 9,699, dated May 10, 1881.

Original No. 141,751, dated August 12, 1873. Application for reissue filed November 30, 1878.

*To all whom it may concern:*

Be it known that I, JOHN BIRKENHEAD, of Mansfield, of the county of Bristol and State of Massachusetts, have invented a new and useful Improvement in Bolsters and Supporting-Rails of Spinning-Machine Spindles; and I do hereby declare the same to be fully described in the following specification, and represented in the accompanying drawings, of which—

Figure 1:
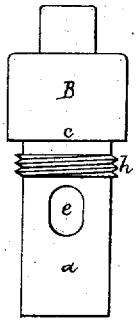
Figure 2:
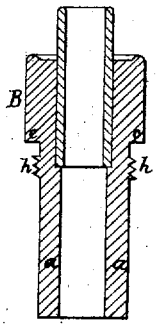
Figure 3:
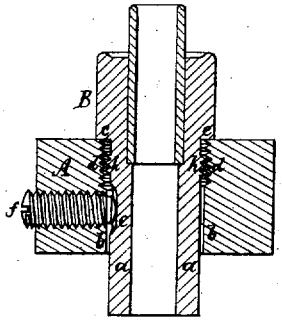

Figure 1 is a side elevation, and Fig. 2 a vertical section, of one of my improved bolsters. Fig. 3 is a vertical section of such bolster and its supporting-rail.

My invention, in the main, consists in the bolster and the rail-socket thereof, provided with a male and female screw-connection, and made and having such connection constructed so as to admit of lateral play of the bolster-shank in the socket, the purpose of which is to enable the bolster to move laterally, so as to accommodate itself to the spindle while the latter may be in rapid revolution.

It is very difficult, if not impossible, to construct a spinning-machine spindle with such perfection that it will not, while in rapid revolution, spring and bind more or less and in the bolster.

To overcome this evil, as well as others, and also to prevent the bolster being drawn up within or out of the rail-socket by the spindle while the latter is being lifted, (the spindle where it goes through the bolster being conical or tapering,) is the object of my invention, which may be thus described:

In the drawings, A denotes the bolster-rail, and B the bolster. The shank *a* of the bolster is cylindrical, and extends into a corresponding socket, *b*, of the rail A. Instead of the shank and socket being made to fit closely together, or diametrically equal, as they usually are, I construct the shank with a diameter somewhat less than that of the socket, in order that the shank may be capable of moving or being moved in any direction (horizontally) in the socket. I also form upon the shank, a short distance from the bearing-shoulder *c* of the bolster, a short male screw, *h*. The socket *b*, I also provide with a corresponding female screw, *d*, to receive the male screw. The diameters of the two screws should be in the same proportion to each other, or about so, as the diameters of the socket and shank, the same being to admit of the slight lateral play of the bolster.

In order to prevent the bolster from being revolved by the spindle so as to be drawn too strongly down upon the rail, or of being unscrewed therefrom, I provide the bolster-shank with a recess, *e*, to receive the inner end of a screw, *f*, inserted in the bolster-rail but not to bear against the shank so as to prevent it from having the necessary lateral play.

The bolster and rail-socket, so constructed and provided with connection-screws, and the recess *e* and screw *f*, have been found to overcome the difficulties incident to the irregularities in the spindle.

I make no claim to the subject or subjects of the United States Patent No. 129,413, in which the bolster and its rail are not provided with connection-screws arranged concentrically upon them, as in my invention such connection-screws not only form additional means of connecting the bolster with the rail, but of preventing the bolster from being raised in its socket when the spindle is drawn upward by the bobbin during the act of removing the bobbin from the spindle. It will thus be seen that my invention embraces more than is covered by the first claim of the said patent, and consequently—

I claim as my invention, as follows, viz:

1. The spindle-bolster, having its shank constructed with a diameter less than that of its rail-socket, so as to be movable horizontally therein, as described, and the two provided with connection-screws *h d*, all being arranged substantially as specified.

2. The spindle-bolster, having its shank provided with the recess *e*, and constructed with a diameter less than that of its rail-socket, and connected therewith by male and female screws, as described, and having a screw, *f*, applied to such recess and the rail, in the manner and for the purpose specified.

JOHN BIRKENHEAD.

Witnesses:
R. H. EDDY,
S. N. PIPER.